(12) United States Patent
Natsume

(10) Patent No.: US 6,961,381 B2
(45) Date of Patent: Nov. 1, 2005

(54) PICTURE DECODING DEVICE

(75) Inventor: Kenichi Natsume, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 621 days.

(21) Appl. No.: 10/124,277

(22) Filed: Apr. 18, 2002

(65) Prior Publication Data

US 2003/0108103 A1 Jun. 12, 2003

(30) Foreign Application Priority Data

Dec. 10, 2001 (JP) ........................ 2001-376063

(51) Int. Cl.[7] .............................................. H04N 7/12
(52) U.S. Cl. .............................................. 375/240.23
(58) Field of Search ........................ 375/240.01, 240.12, 375/240.18, 240.23, 240.24, 240.26, 240.29; H04N 7/12

(56) References Cited

U.S. PATENT DOCUMENTS

| | | | |
|---|---|---|---|
| 4,580,231 A | * 4/1986 | Tidd et al. | ............... 715/513 |
| 5,691,768 A | 11/1997 | Civanlar et al. | |
| 5,699,117 A | * 12/1997 | Uramoto et al. | ......... 348/390.1 |
| 5,812,735 A | * 9/1998 | Wada | ........................ 386/81 |
| 6,404,817 B1 | * 6/2002 | Saha et al. | ............ 375/240.27 |

FOREIGN PATENT DOCUMENTS

JP      2000-299853      10/2000

* cited by examiner

*Primary Examiner*—Nhon Diep
(74) *Attorney, Agent, or Firm*—Nixon Peabody LLP; Donald R. Studebaker

(57) ABSTRACT

A picture decoding device of the present invention comprises a CPU, receiving as input encoded moving picture information, for subtracting '1' from a slice start inside slice information extracted from this information, a variable length code decoding circuit provided with a horizontal position generating circuit for subtracting '1' from a macro block address (MBA) when output information formed from macro block position information (VP, HP), motion vectors, picture information etc. is output, using information output from the CPU, and a motion compensation circuit for carrying out decoding processing for the moving picture information, with origin coordinates set to (0,0), using a slice start code and macro block address after subtraction.

12 Claims, 12 Drawing Sheets

FIG.1 Overall structure of the embodiment

FIG. 2 Variable length encoding and decoding circuit of first embodiment

FIG. 3 Vertical position generating circuit of first embodiment

FIG. 4 Horizontal position generating circuit of first embodiment

MB0, MB1, MB2 → 1 slice

FIG. 6   Slice structure of first embodiment

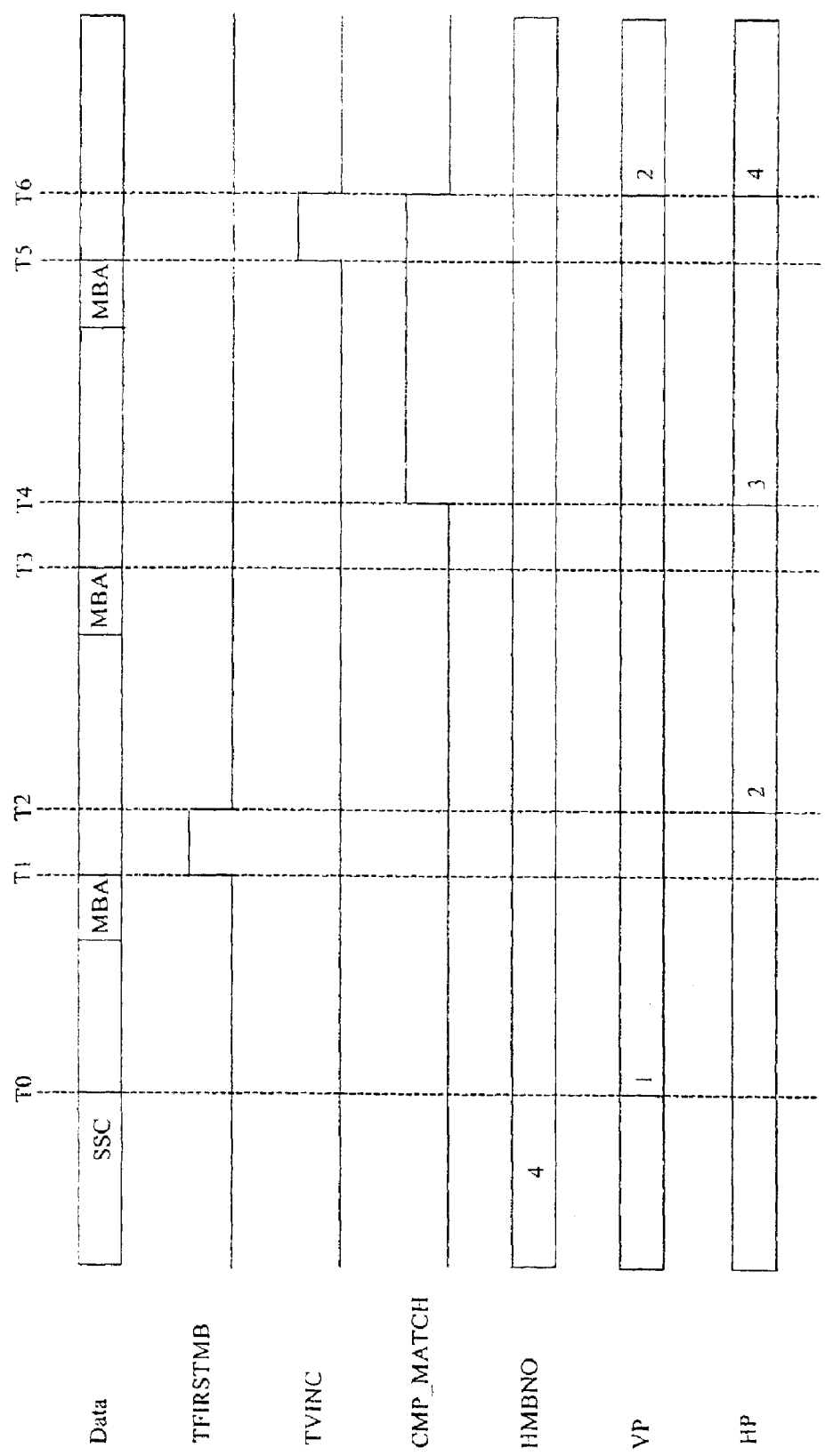
FIG. 7 Operation of first embodiment

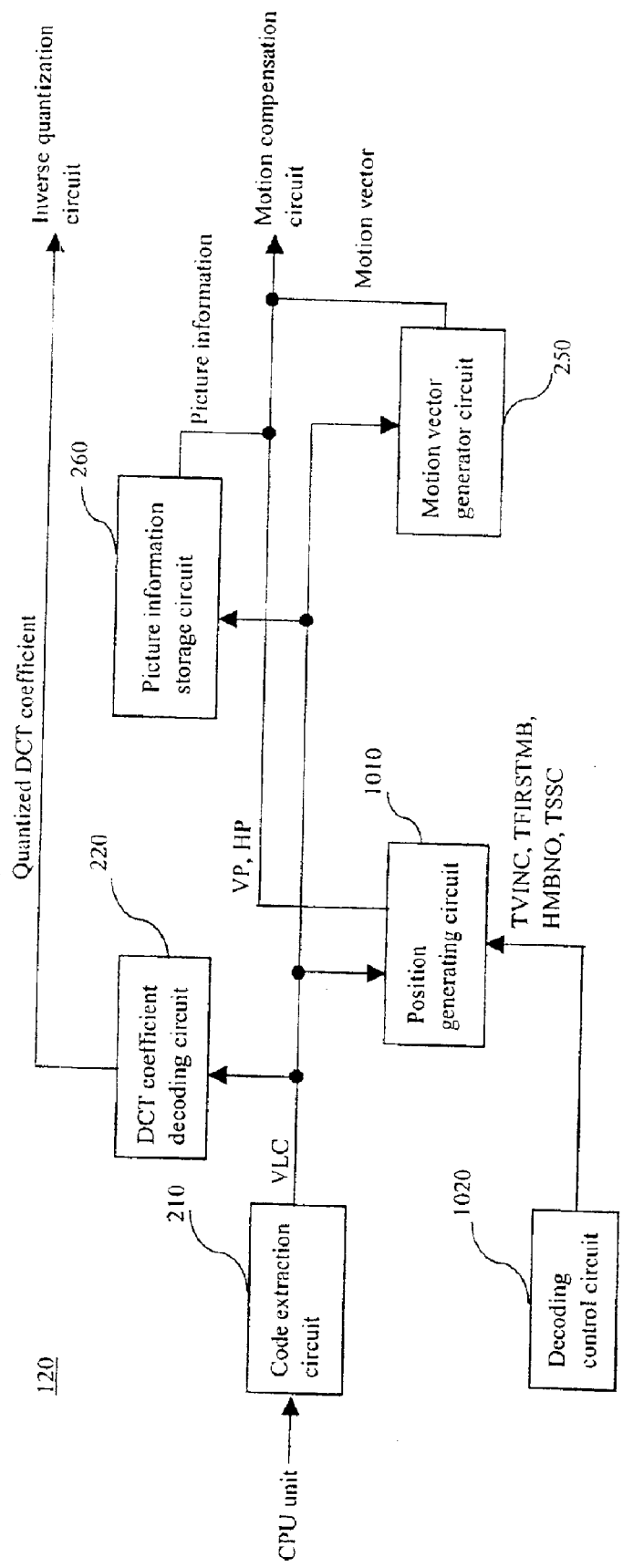
FIG. 8 Variable length encoding and decoding circuit of second embodiment

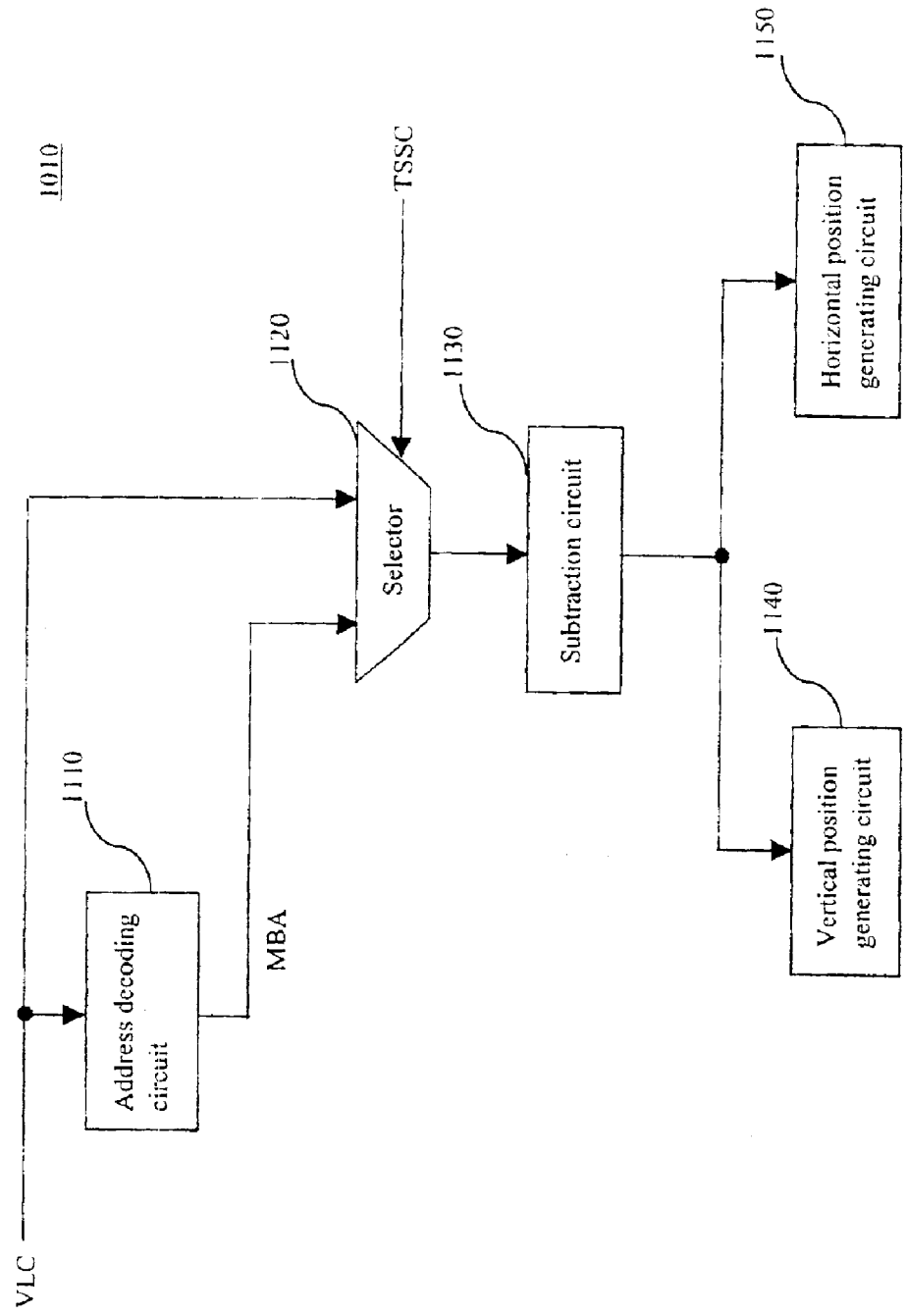
FIG. 9 Position generating circuit of second embodiment

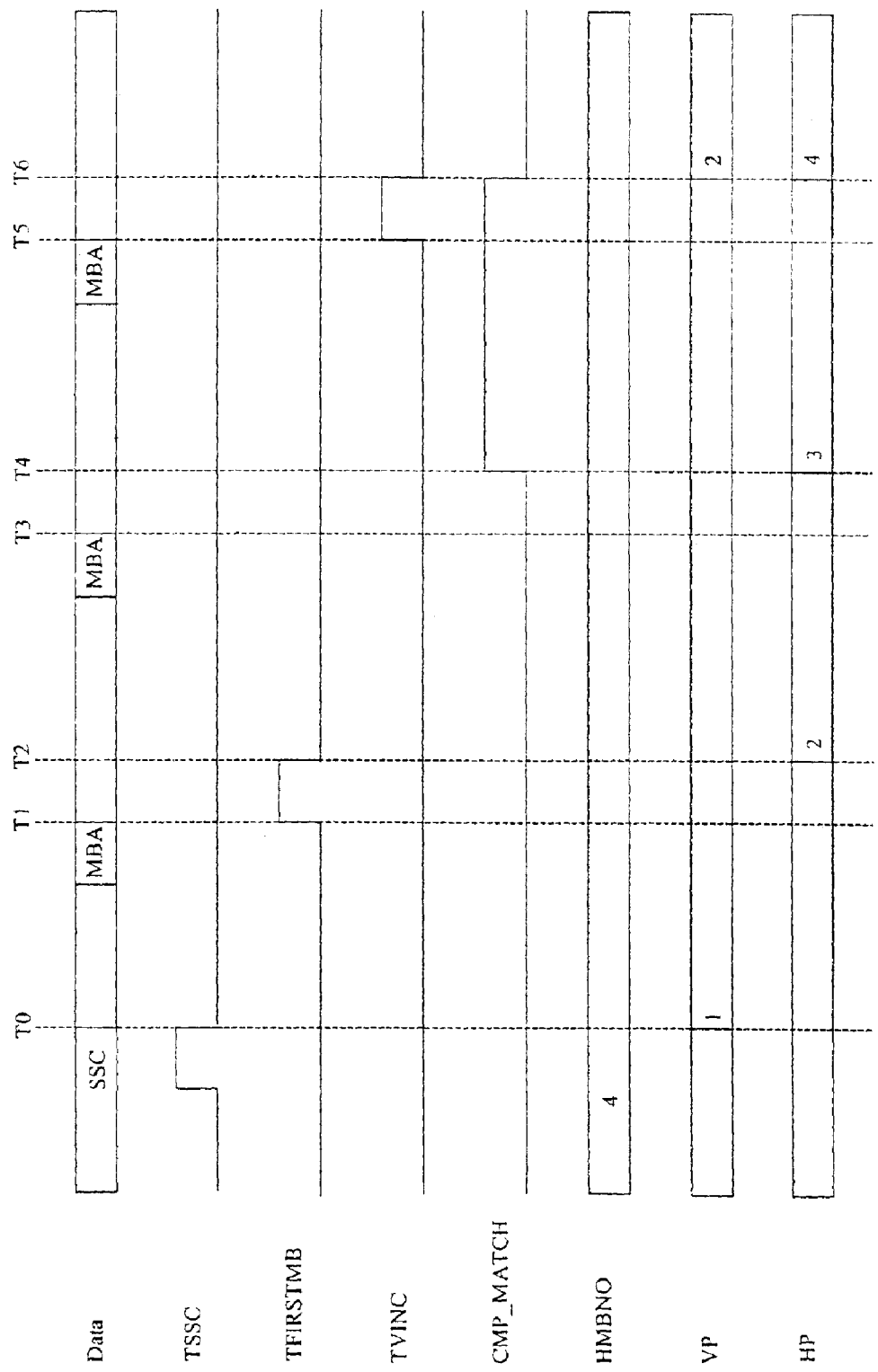
FIG.10 Operation of second embodiment

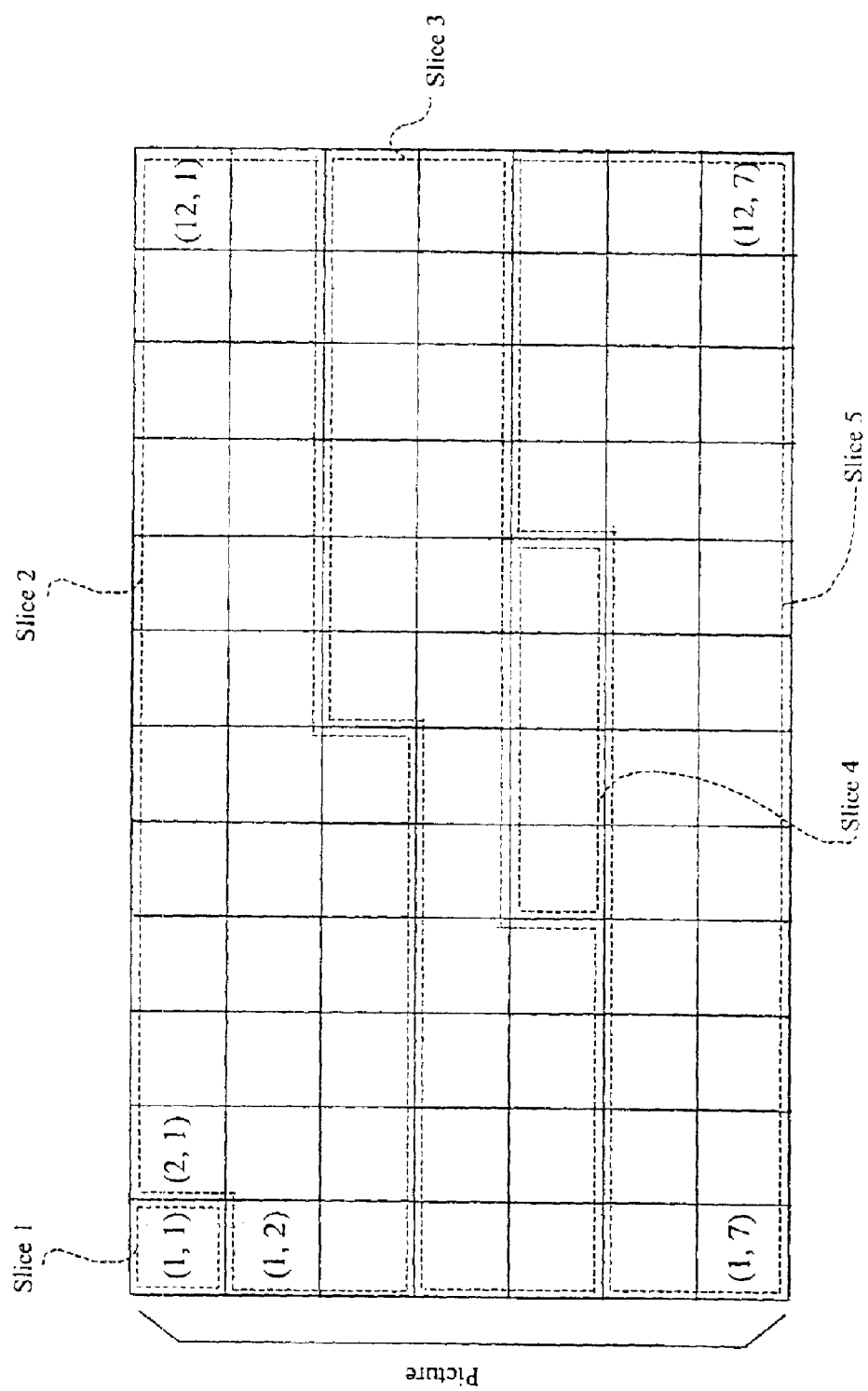
FIG. 11 Structure of picture data (first)

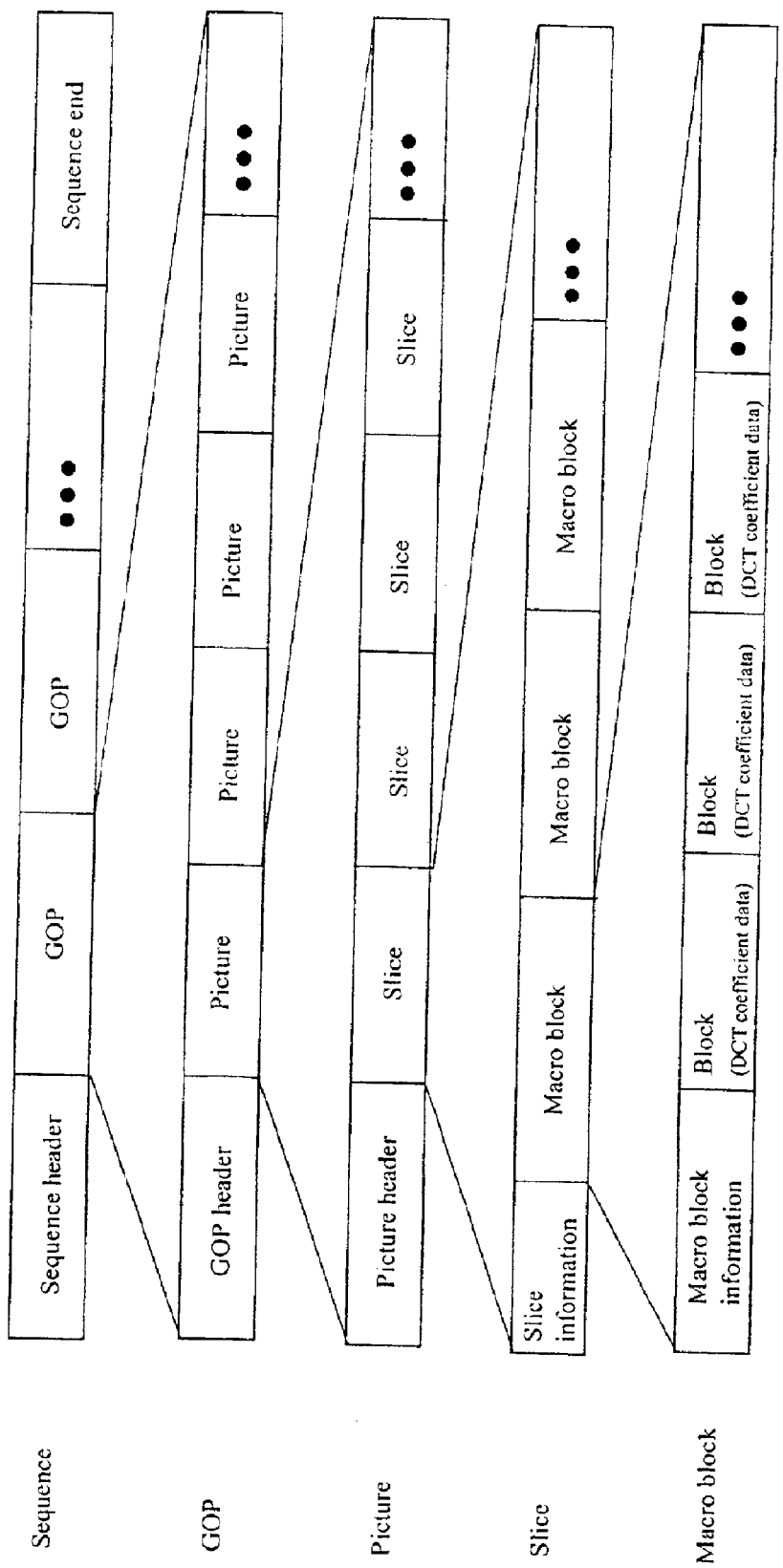
FIG.12 Structure of picture data (second)

PICTURE DECODING DEVICE

TECHNICAL FIELD

The present invention relates to technology for decoding picture information that has been encoded using compression technology, such as MPEG (Moving Picture Experts Group). In more detail, the present invention relates to technology for converting macro block position coordinates included in picture information.

BACKGROUND OF THE INVENTION

MPEG, for example, is well known as technology for compressing picture information. MPEG is technology for compressing moving picture information using processing such as motion compensation prediction encoding, Discrete Cosine Transform (DCT), quantization and variable length encoding. MPEG1 and MPEG2 exist as implementations of MPEG.

FIG. 11 is a schematic diagram showing the structure of an MPEG picture. A moving picture is made up of a plurality of still pictures. Each still picture comprises a plurality of pixels arrayed in horizontal and vertical directions. A still picture is divided into macro blocks comprising 16×16 pixels. In the example shown in FIG. 11, a still picture is divided up into 12×7 macro blocks. Two-dimensional coordinates (m, n) are attached to each macro block.

m is the coordinate for the horizontal direction, while n is the coordinate for the vertical direction. Coordinates of the macro block at the upper left end of the still picture screen are (1,1), and these are the origin coordinates.

With MPEG, overall picture information corresponding to one still screen is called a picture. One picture contains at least one slice. In the example of FIG. 11, a picture contains 5 slices (slice 1-slice 5). One slice contains at least one macro block. A slice is a set of macro blocks. That is, picture information has a layer structure composed of picture, slices and macro blocks.

Motion compensation prediction encoding, quantization and variable length encoding are carried out in macro block units. Discrete cosine transform is achieved by dividing a macro block into blocks, each comprising 8×8 pixels.

This series of compression processing operations is carried out sequentially in a horizontal direction from the macro block at the origin. If the right edge macro bock is then compressed, the next horizontal string is sequentially compressed from the left edge macro block.

In the example shown in FIG. 11, macro block (1,1) is initially compressed, and next the macro block (2,1) is compressed. If macro block (12,1) is compressed, then macro block (1, 2) is compressed next. Accordingly, macro blocks included in the same slice are continuous in the horizontal direction. With MPEG1, macro blocks included in the same slice are sometimes divided across two or more horizontal rows. (FIG. 11) Conversely, with MPEG2, macro blocks included in the same slice are always contained in the same horizontal row.

With MPEG, serial data is generated from picture information that has been compression encoded. MPEG serial data has a layer structure, corresponding to the layer structure of the picture. FIG. 12 is a schematic drawing showing the MPEG1 data structure. An encoded signal of the overall moving picture information is called a sequence. A sequence contains one sequence header, at least one GOP (group of pictures) and one sequence end. Each GOP contains one GOP header and at least one picture. Each picture contains one picture header and at least one slice. Each slice contains one item of slice information and at least one macro block. Each macro block then contains one item of macro block information and at least one block. DCT encoded data is stored in a block.

Decoding of MPEG picture information is carried out in the reverse order to encoding. Specifically, decoding of variable length code inverse quantization, inverse discrete cosine transform and motion compensation processing are sequentially executed. In each of these processing operations, the macro block processing order is the same as for the case of encoding processing. Specifically, a series of decoding processes is executed sequentially in the horizontal direction from the macro block of the origin (1,1).

As described above, the origin coordinate for macro block position control is (1,1), and not (0,0). However, in the event that the origin coordinate is determined to be (1,1), there is a problem that a motion compensation processing circuit and a variable length code decoding processing circuit become complicated.

With motion compensation processing, motion compensation for a particular picture is sometimes carried out with reference to another picture. For this reason, the picture referred to is temporarily stored in a frame memory after being decoded. In a normal memory, addresses begin at '0'. Accordingly, when storing a picture for reference in the frame memory, it is necessary to respectively subtract '1' from the horizontal and vertical position coordinates of the macro block. For this reason, it is necessary to provide two subtractors in the motion compensation circuit.

With variable length encoding processing, when skipped macro block processing is performed, it is necessary to control the positional coordinates of the macro block. For this reason, after processing for macro blocks at the right end has been completed, the horizontal direction coordinate must be reset to '1', but a counter circuit for resetting to '1' has a complicated structure compared to a normal counter circuit, namely a counter circuit for resetting to '0'.

Also, with variable length decoding processing, bit stream error concealment processing is carried out. With this error concealment processing, control is carried out for whether or not the coordinates of the macro block are the currently existing coordinates. With the example in FIG. 11, a case where the horizontal coordinate is greater than '12' or the vertical coordinate is greater than '7' will constitute an error. Also, since the origin coordinates are (1,1), the case where the horizontal coordinate or the vertical coordinate is '0' will also constitute an error. Accordingly, since the origin coordinates are (1,1), it is necessary to check whether the horizontal coordinate or the vertical coordinate is '0', which complicates the circuitry.

SUMMARY OF THE INVENTION

The present invention provides technology to convert macro block origin coordinates to (0,0) with simple processing.

A picture decoding device of the present invention comprises, a CPU, receiving as input encoded moving picture information, for subtracting '1' from a slice start code inside slice information extracted from the input information, a variable length code decoding circuit provided with a horizontal position generating circuit for subtracting '1' from a macro block address (MBA) when outputting output information, comprising macro block position information (VP, HP) motion vectors, picture information, etc., using information output from the CPU, and a motion compensation circuit for carrying out decoding processing for the moving picture information, with origin coordinates (0,0), using a slice start code and macro block address after subtraction.

BRIEF DESCRIPTION OF THE DRAWINGS

FIG. 6 is a schematic drawing for describing operation of the moving picture decoding device of the first embodiment.

FIG. 7 is a timing chart for describing operation of the variable length code decoding circuit of the first embodiment.

FIG. 8 is a block diagram schematically showing the internal structure of the variable length code decoding circuit of the second embodiment.

FIG. 9 is a block diagram schematically showing the internal structure of the position generating device of FIG. 8.

FIG. 10 is a timing chart for describing the operation of a variable length code decoding circuit of the second embodiment.

FIG. 11 is a schematic diagram for describing picture compression technology.

FIG. 12 is a schematic diagram for describing picture compression technology.

DETAILED DESCRIPTION OF THE INVENTION

Figure 1:
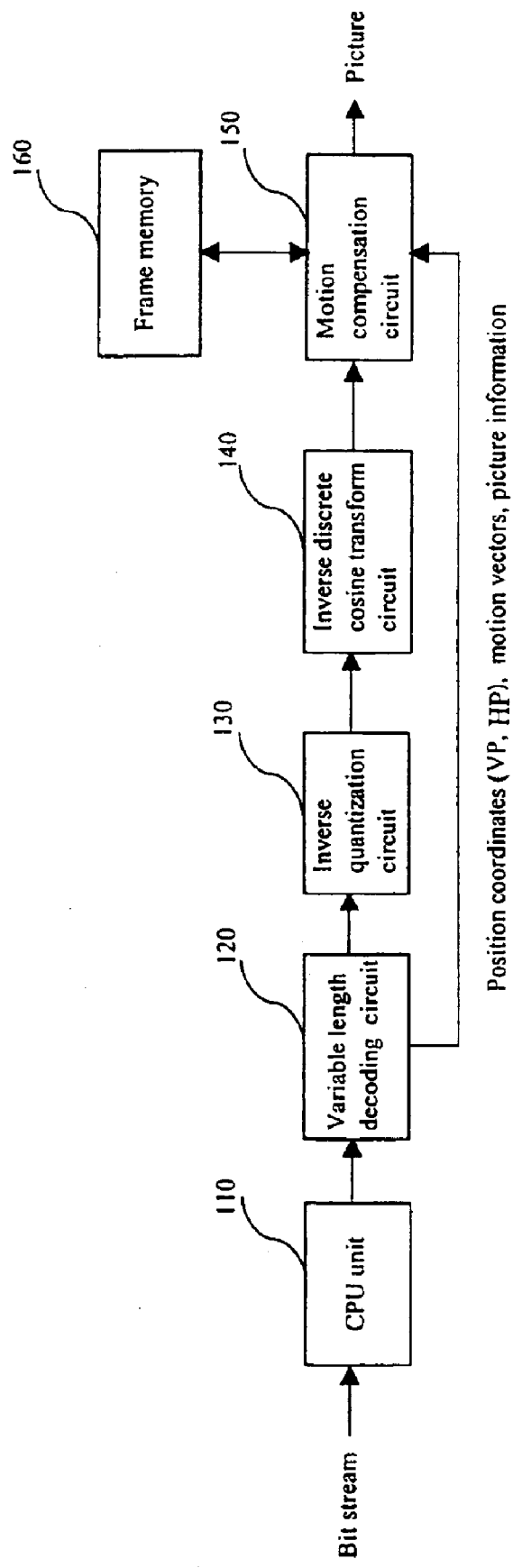
FIG. 1 is a block diagram schematically showing the overall structure of an picture decoding device of an embodiment of the present invention.

In the following, embodiments of the present invention will be described, using the drawings. In the drawings, the size, shape and arrangement relationship of each of the structural components are schematically shown to such an extent as to enable understanding the present invention, and numerical conditions in the following description are merely for example.

First Embodiment

A picture decoding device of the first embodiment of the present invention will be described in the following, using FIG. 1–FIG. 7 and Tables 1 and 2. FIG. 1 is a block diagram schematically showing the structure of a picture decoding device of this embodiment. As shown in FIG. 1, this picture decoding device comprises a CPU 110, a variable length code decoding circuit 120, an inverse quantization circuit 130, an inverse discrete cosine transform circuit 140, a motion compensation circuit 150, and a frame memory 160.

The CPU 110 is input with MPEG encoded moving picture information (see FIG. 12) from the outside as a bit stream. The CPU 110 then separates this bit stream into layers, and performs fixed processing defined by MPEG. In addition, with this embodiment, the CPU 110 rewrites the slice start code within the slice information (see FIG. 12) so that the vertical direction origin coordinate becomes '0'. The slice start code refers to code representing a vertical position coordinate for a head macro block of the slice. Details of this rewriting processing will be given later. The variable length code decoding circuit 120 decodes variable length codes using information input from the CPU 110. Using this decoding, DCT encoded data (see FIG. 12) is converted to a quantized DCT coefficient. Further, the variable length code decoding circuit 120 generates and outputs macro block position information, motion vectors and picture information etc. from the information input from the CPU 110. The macro block position information is made up of a vertical position coordinate (VP) and a horizontal position coordinate (HP). As will be described later, with this embodiment, the position coordinates (VP, HP) when the origin coordinates have been set to (0,0) are generated using the variable length code decoding circuit 120.

The inverse quantization circuit 130 is input with a quantized DCT coefficient from the variable length code decoding circuit 120, and subjects it to inverse quantization. In this way, a DCT coefficient is acquired.

The inverse discrete cosine transform circuit 140 is input with a DCT coefficient from the inverse quantization circuit 130, and subjects this DCT coefficient to inverse discrete cosine transform.

The motion compensation circuit 150 is sequentially input with preceding picture data from the inverse discrete cosine transform circuit 140. The motion compensation circuit 150 is also input with information such as macro block position information VP, HP from the variable length code decoding circuit 120. As is well known, as the picture, there are a picture which has not been subjected to motion compensation prediction processing (I picture), a picture that has been subjected to motion compensation prediction processing with reference to only a preceding picture (P picture) and a picture that has been subjected to motion compensation prediction processing with reference to pictures both before and after (B picture). An I picture or P picture can constitute a reference picture for another P picture or B picture. The motion compensation circuit 150 performs motion compensation using information such as reference pictures, macro block position information, motion vectors etc. In this way, moving picture information is restored. This motion compensation processing is performed with the origin coordinates as (0,0).

The frame memory 160 is used to temporarily store reference pictures. Reference pictures are stored as required in the frame memory 160, and read out as required from the frame memory 160 by the motion compensation circuit 150.

Figure 2:
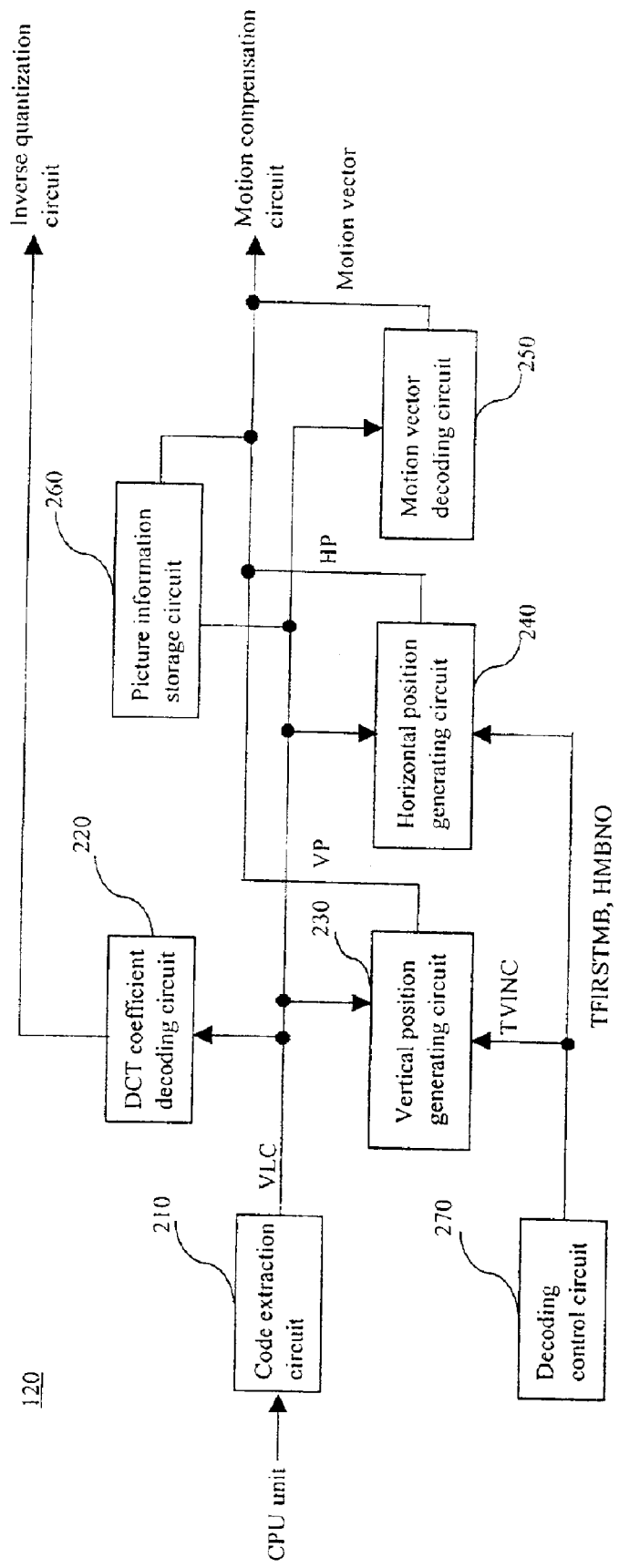
FIG. 2 is a block diagram schematically showing the internal structure of a variable code decoding circuit of the first embodiment.

FIG. 2 is a block diagram schematically showing the essential structure of the variable length code decoding circuit 120. As shown in FIG. 2, the variable length code decoding circuit 120 comprises a code extraction circuit 210, a DCT coefficient decoding circuit 220, a vertical position generating circuit 230, a horizontal position generating circuit 240, a motion vector decoding circuit 250, a picture information storage circuit 260 and a decoding control circuit 270.

The code extraction circuit 210 is provided with a code length table and a shift circuit, both not shown in the drawing. This code extraction circuit 210 inputs, from the data output from the CPU 110, data below the slice layer (slice information, and macro block layer data belonging to this slice), and some information stored in a picture header, in parallel (refer to FIG. 12). The code extraction circuit 210 extracts initial variable length code data and fixed length code data from input data using information stored in the code length table. Extracted data is output from the code extraction circuit 210 as initial code data VLC. Next, the code extraction circuit 210 carries out header extraction of remaining input data using a shift circuit, and extracts subsequent variable length code data or fixed length code data using information of the code length table. Extracted data is output from the code extraction circuit 210 as second code data VLC.

After that, in a similar fashion, the code extraction circuit 210 separates input data for each variable length code data or each fixed length code data, and outputs this as code data VLC.

The DCT coefficient decoding circuit 220 decodes the DCT code data inside code data VLC. As described above, a quantized DCT coefficient is acquired using this decoding. The quantized DCT coefficient is sent to the inverse quantization circuit 130. The vertical position generating circuit 230 reads out slice start code for the code data VLC. As has been described above, this slice start code is re-written to a value corresponding to origin coordinate '0' by the CPU 110. The vertical position generating circuit 230 sequentially generates vertical position coordinates VP using the slice start code after rewriting. Accordingly, the vertical coordinates VP become values corresponding to origin coordinate '0'. These vertical position coordinates VP are sent to the motion compensation circuit 150 (refer to FIG. 1). The internal structure of the vertical position generating circuit 230 will be described later using FIG. 3.

The horizontal position generating circuit 240 reads out a macro block address MBA for code data VLC. The macro block address MBA represents horizontal position coordinates of the macro block. This macro block address MBA is stored in an encoded state within the macro block information (refer to FIG. 12). The horizontal position generating circuit 240 decodes the macro block address MBA so as to become an address value corresponding to a horizontal origin coordinate of '0'. The horizontal position generating circuit 240 then generates a horizontal position coordinate HP using this macro block address MBA. The internal structure of the horizontal position generating circuit 240 will be described later using FIG. 4.

The motion vector decoding circuit 250 reads out motion vectors from code data VLC and sends this data to the motion compensation circuit 150. The picture information storage circuit 260 receives part of the picture information from the code data VLC, and stores it. This stored data is sent to the motion compensation circuit 150. Information stored in the picture information storage circuit 260 is the size of a picture, type of picture encoding etc.

The decoding control circuit 270 performs control or state management of other circuits 210–260 inside the variable length code decoding circuit 120. As will be described later, the decoding control circuit 270 sends a signal YVINC to the vertical position generating circuit 230, and also sends signals TFIRSTMB and HMBNO to the horizontal position generating circuit 240.

Figure 3:
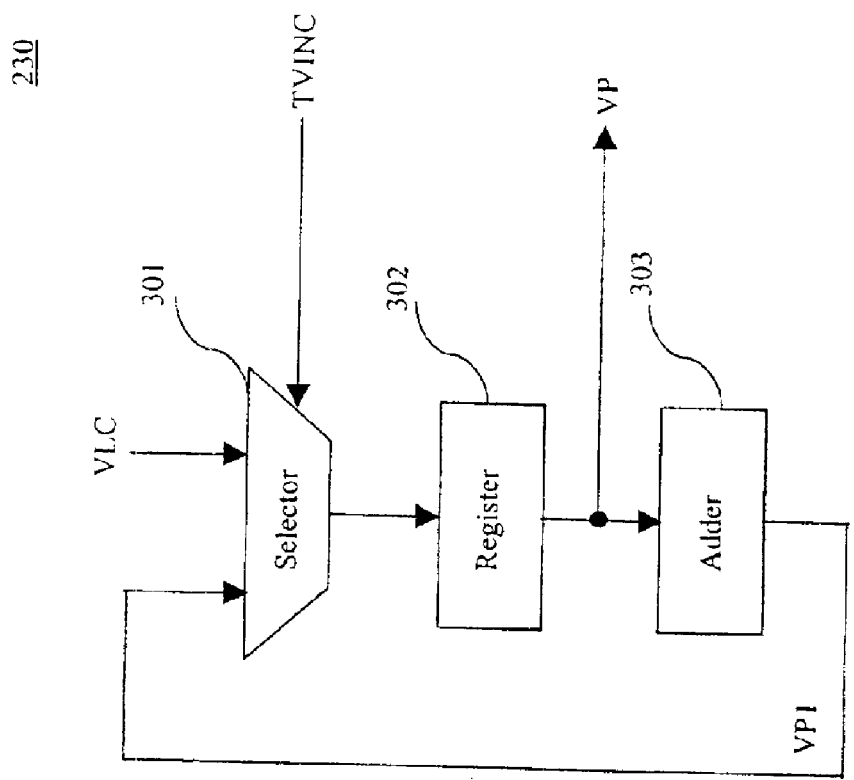
FIG. 3 is a block diagram schematically showing the internal structure of a vertical position generating circuit of FIG. 2.

FIG. 3 is a circuit diagram showing the internal structure of the vertical position generating circuit 230. As shown in FIG. 3, the vertical position generating circuit 230 comprises a selector 301, a register 302 and an adder 303.

The selector 301 receives code data VLC and output data VP1 of the adder 303 as inputs. The selector 301 then outputs the code data VLC when the value of a selection signal TVINC input from the decoding control circuit 270 is '0', and outputs the data VP1 when the value of the selection signal TVINC is '1'.

The register 302 stores output data from the selector 301 as macro block vertical position information.

The adder 303 outputs a value that is one added to the data input from the register 302 as data VP1.

Figure 4:
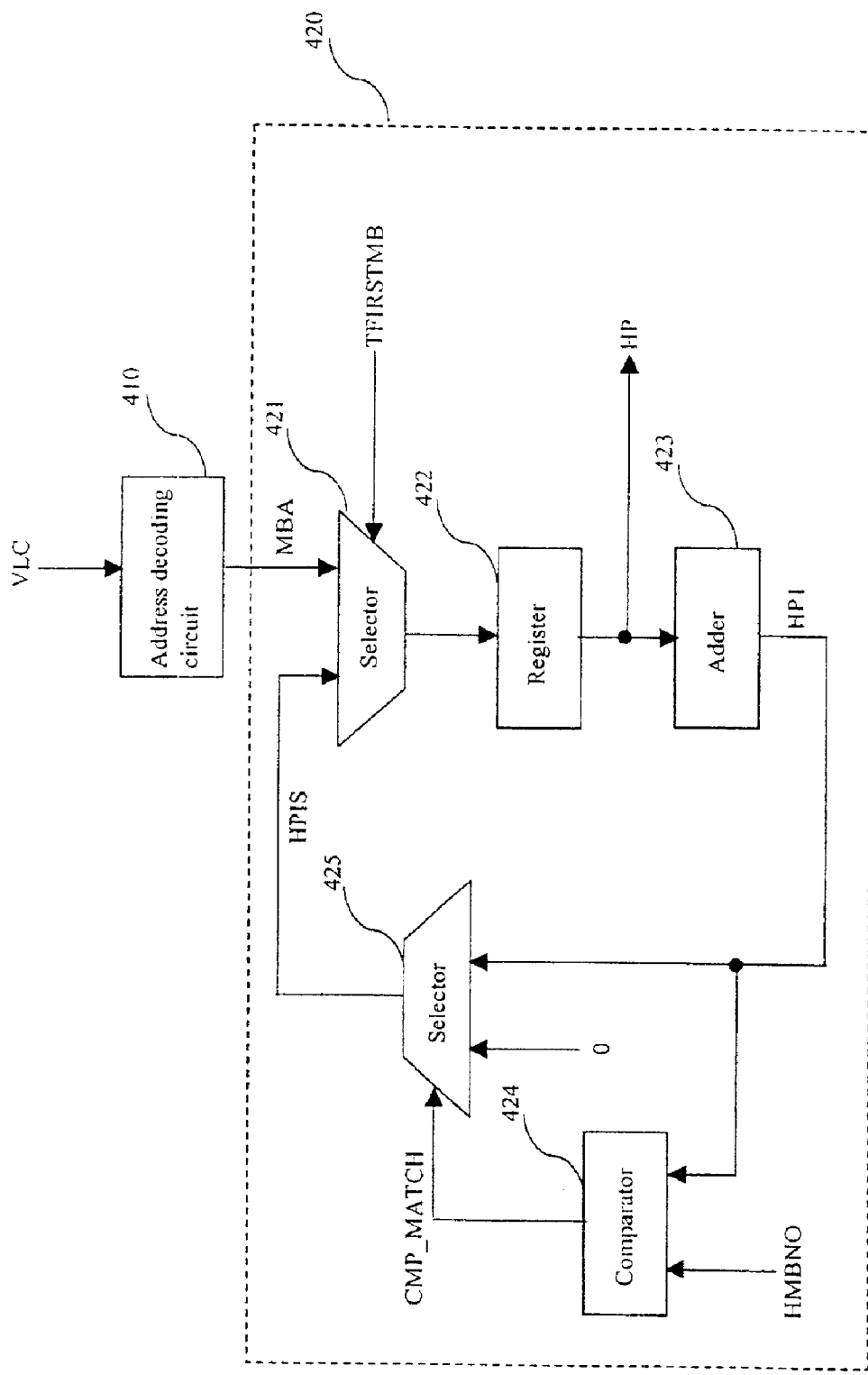
FIG. 4 is a block diagram schematically showing the internal structure of a horizontal position control circuit of FIG. 2.

FIG. 4 is a circuit diagram showing the internal structure of the horizontal position generating circuit 240. As shown in FIG. 4, the horizontal position generating circuit 240 comprises an address decoding circuit 410 and a horizontal position control circuit 420. Also, the horizontal position control circuit 420 is provided with a selector 421, a register 422, an adder 423, a comparator 424 and a selector 425.

The address decoding circuit 410 extracts a macro block address MBA from code data VLC, and decodes this macro block address MBA. With this embodiment, the address decoding circuit 410 decodes the macro block address MBA to a value that is '1' less than an original value, namely a value before encoding using the picture compression device. The decoded macro block address is stored inside the address decoding circuit 410.

The selector 421 is input with macro block address MBA from the address decoding circuit 410, and with data HPIS from the selector 425. The selector 421 then outputs the macro block address MBA when a select signal TFIRSTMB input from the decoding control circuit 270 is '1', and outputs data HPIS when the select signal TFIRSTMB is '0'. The register 422 stores output data from the selector 421 as macro block horizontal position information. The adder 423 outputs a value that is 1 added to data input from the register 422 as data HP1. The comparator 424 is input with data HP1 and a number of horizontal direction macro blocks HMBNO. The comparator 424 outputs '1' as the select signal CMP_MATCH when these values HP1 and HMBNO match. On the other hand, when the values HP1 and HMBNO do not match the comparator 424 outputs '0' as the select signal CMP_MATCH. The selector 425 receives data '0' and data HP1 as inputs. The selector 425 then outputs data '0' when the select signal CMP_MATCH is '1', and outputs data HP1 when the select signal CMP_MATCH is '0'.

Next, operation of the picture decoding device of this embodiment will be described. In the following, description will be given adopting an example of the case where there is no skipped macro block processing.

Figure 5:
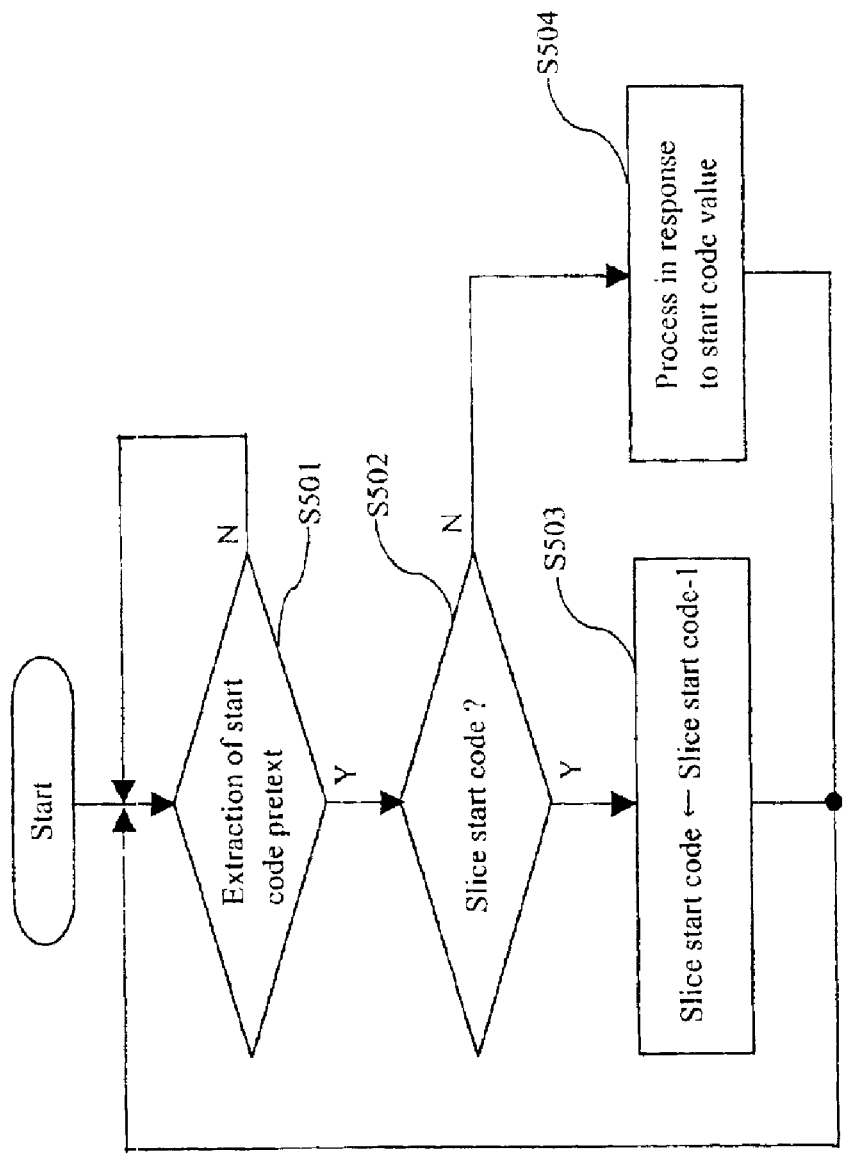
FIG. 5 is a flow chart for describing operation of the CPU of the first embodiment.

A bit stream constituting moving picture information is input to the CPU 110 (refer to FIG. 1). The CPU 110 executes processing such as is shown in the flowchart of FIG. 5. First of all, the CPU 110 searches for the head of each layer from the bit stream (step S501). A start code prefix is stored in the head of each layer. The start code prefix is a bit stream of '0000 0000 0000 0000 0000 0001'. It is possible to detect the head of each layer by searching for the start code prefixes.

After the start code prefixes, start code numbers are stored. Table 1 is a list of start code numbers shown in hexadecimal. The CPU 110 determines code name from the start code numbers (step S502).

TABLE 1

As shown in Table 1, if the start code number is 01-AF (hexadecimal), this code is a slice start code. If the code is a slice start code, the CPU 110 subtracts '1' from this slice start code (step S503). The CPU 110 then rewrites the slice start code to the subtraction result. FIG. 6 is a schematic drawing showing a structural example of a slice. If the slice contains three macro blocks MB0 (3,2), MB1 (4,2) and MB2 (1,3) as shown in FIG. 6, the vertical position coordinate of the head macro block MB0 is '2', and so the slice start code after subtraction is rewritten to '1'. As described above, the slice start code represents the vertical position coordinate of the macro block at the head of that slice. Accordingly, this vertical direction coordinate is converted to a coordinate when the origin coordinate is '0' using the processing of step S503.

Carrying on, the CPU 110 sends data below this slice layer (slice information and macro block information belonging to that slice) to the variable length code decoding circuit 120 in parallel.

On the other hand, if the start code number is not a slice start code in step S502, this layer is not a slice. In this case, the CPU 110 executes processing corresponding to this start code number (S504). The content of this processing is defined by the MPEG.

After that, the CPU 110 commences searching for the next start code prefix (step S501). The variable length code decoding circuit 120 (refer to FIG. 1) is input with output data from the CPU 110. FIG. 7 is a timing chart for describing operation of the variable length code decoding circuit 120.

At time T0, the code extraction circuit 210 (refer to FIG. 2) extracts the header of the slice start code. This slice start code is input to the selector 301 of the vertical position generating circuit 230 (refer to FIG. 3). Also, at time T0, the select signal TVINC is '0'. Accordingly, the selector 301 selects code data VLC, namely, the slice start code. As has been described above, this slice start code is rewritten to a value that is one less than the slice start code at the time of compression processing (to '1' in the example of FIG. 7). The slice start code output from the selector 301 is temporarily stored in the register 302. As described above, the slice start code is stored in the picture information without compression encoding. Accordingly, this stored value directly becomes the vertical position coordinate VP of the macro block MB0. The adder 303 adds '1' to the value stored in the register 302. The result of this addition is input to the selector 301 as data VP1.

At time T1, the code extraction circuit 210 extracts the header of the macro block address MBA of the head macro block MB0. When header extraction for the macro block address MBA of the head macro block MB0 has been performed, the decoding control circuit 270 sets the signal TFIRSTMB to '1'. This macro block address MBA is input to the address decoding circuit 410 of the horizontal position generating circuit 240. As described above, the macro block address MBA is stored in the macro block layer in a compression encoded state. The address decoding circuit 410 decodes this macro block address MBA. Here, the address decoding circuit 410 decodes the macro block address MBA to a value '1' less than an original value, namely a value before encoding using the picture compression device. Table 2 is a table showing the relationship between address MBA before encoding, address MBA after encoding, and address MBA after decoding.

TABLE 2

In this way, with this embodiment, by decoding the macro block address MBA to a value '1' less than a value before encoding, the head macro block address MBA is set to a value corresponding to the horizontal origin coordinate '0'. With the example of FIG. 6, the address MBA of the head macro block MB0 becomes '2'.

At time T2, the decoded macro block address MBA is input to the selector 421 (refer to FIG. 4). At this time, the select signal TFIRSTMB is '1'. Accordingly, the selector 421 selects the macro block address MBA. The macro block address MBA output from the selector 421 ('2' in the example of FIG. 6) is temporarily held in the register 422. After that, the decoding control circuit 270 sets the select signal TFIRSTMB to '0'.

The value stored in the register 422 is input to the adder 423. The adder 423 adds '1' to this input value and outputs this as data HP1.

The comparator 424 is input with the number of horizontal direction macro blocks HMBNO from the decoding control circuit 270 (refer to FIG. 2). The comparator 424 also compares this value HMBNO and output data HP1 of the register 422. Here, the value of the data HP1 is '2'. Also, with the example of FIG. 6, the number of horizontal direction macro blocks is '4'. Accordingly, the comparator 424 sets the output signal CMP_MATCH to a value '0' representing mismatch. The selector 425 outputs data HP1 as signal HPIS when the signal CMP_MATCH is '0'. Accordingly, the value of signal HPIS is '3'.

After that, the code extraction circuit 210 (refer to FIG. 2) sequentially outputs block data of the macro block MB0, namely DCT encoded data. The DCT encoded data is decoded using the DCT coefficient decoding circuit 220. In this way, a quantized DCT coefficient is acquired. This decoding is completed by time T3. If decoding of the DCT encoded data is completed, a quantized DCT coefficient is sent to the inverse quantization circuit 130, and the values held in the registers 302 and 422 are output to the motion compensation circuit 150 as position coordinates VP, HP.

At time T3, the code extraction circuit 210 performs header extraction for the macro block address MBA of the next macro block MB1. This macro block address MBA is decoded in accordance with the rules of Table 2, by the address decoding circuit 410. With the example of FIG. 6, the address MBA of macro block MB1 becomes '0'.

At time T4, the decoded macro block address MBA is input to the selector 421. However, at time T4, since this macro block address MBA is not the head macro block address, the select signal TFIRSTMB is '0'. Accordingly, the selector 421 selects data HPIS and not the address MBA.

Data HPIS output from the selector 421 is held in the register 422. The value stored in the register 422 is '3'.

The adder 423 adds '1' to the stored value of the register 422 and outputs this as data HP1. Accordingly, the value of data HP1 becomes '4'.

Since signal HMBNO and data HP1 match, the comparator 424 changes the output signal CMP_MATCH to '1'. This means that the selector 425 outputs value '0' as signal HPIS.

After that, the code extraction circuit 210 sequentially outputs block data, namely DCT coefficient data. The DCT coefficient data is decoded using the DCT coefficient decoding circuit 220. In this way, a quantized DCT coefficient is acquired. If decoding of DCT coefficient data is completed, a quantized DCT coefficient is sent to the inverse quantization circuit 130, and the values held in the registers 302 and 422 are output to the motion compensation circuit 150 as position coordinates VP, HP.

At time T5, the code extraction circuit 210 extracts the header of the macro block address MBA of the macro block MB2. This macro block address MBA is decoded in accordance with the rules of Table 2, by the address decoding circuit 410. With the example of FIG. 6, the address MBA of the macro block MB1 becomes '0'.

At time T6, the decoded macro block address MBA is input to the selector 421. However, at time T6 the select signal TFIRSTMB is '0'. Accordingly, the selector 421 selects data HPIS and not the address MBA. Data HPIS output from the selector 421 is held in the register 422. The value stored in the register 422 is '0'.

The adder 423 adds '1' to the stored value of the register 422 and outputs as data HP1. Accordingly, the value of data HP1 becomes '1'. Since signal HMBNO and data HP1 do not match, the comparator 424 changes the output signal CMP_MATCH to '0'. This means that the selector 425 outputs value '1' as signal HPIS.

Also, during the period from time T5 to time T6, the value of the select signal TVINC becomes '1'. Accordingly, the selector 301 (refer to FIG. 3) selects signal VP1. As a result, the value held by the register 302 becomes '2'.

After that, the code extraction circuit 210 sequentially outputs block data, namely DCT coefficient data. The DCT coefficient data is decoded using the DCT coefficient decoding circuit 220. In this way, a quantized DCT coefficient is acquired. If decoding of DCT coefficient data is completed, a quantized DCT coefficient is sent to the inverse quantization circuit 130, and the values held in the registers 302 and 422 are output to the motion compensation circuit 150 as position coordinates VP, HP.

In this way, variable length code decoding processing for a slice made up of macro blocks MB0, MB1 and MB2 is completed. After that, the circuits 130, 140 and 150 at subsequent stages perform each of the processes defined by MPEG.

As described above, with the picture decoding device of this embodiment, it is possible to change the macro block origin coordinate from (1,1) to (0,0) by using the CPU 110 to rewrite the value of the slice start code to a value that is '1' less (refer to FIG. 5), and decoding the macro block address MBA to a value that is '1' less than a value before encoding using the address decoding circuit 410 provided in the horizontal position generating circuit 240 within the variable length code decoding circuit 120 (refer to Table 2). Accordingly, the scale of the variable length code decoding circuit 120 and the motion compensation circuit 150 is reduced, and design is simplified.

Second Embodiment

Next, description will be given of a picture decoding device of a second embodiment of the present invention using FIG. 8 to FIG. 10.

The overall structure of the picture decoding device of this embodiment is the same as the device of the first embodiment (refer to FIG. 1). However, the content of processing carried out by the CPU 110 and the internal structure of the variable length code decoding circuit 120 are different from those of the device of the first embodiment. The CPU 110 is different from the first embodiment in that it does not carry out processing to rewrite the slice start code inside the slice information (refer to FIG. 12). That is, the slice start code is sent to the variable length code decoding circuit 120 directly, with the vertical direction origin coordinate being '1'.

The variable length code decoding circuit 120, as with the first embodiment, carries out decoding of variable length code, generation of macro block position information, generation of motion vectors and generation of picture information. Coordinates VP, HP corresponding to origin coordinates (0,0) are generated as the macro block position information VP, HP. In the variable length code decoding circuit 120 of this embodiment, the structure of a circuit for generating macro block position information VP, HP is different from that of the variable length code decoding circuit 120 of the first embodiment (refer to FIG. 2).

FIG. 8 is a block diagram showing the internal structure of the variable length code decoding circuit 120. In FIG. 8, components having the same reference numerals as in FIG. 2 represent the same components.

As shown in FIG. 8, the variable length code decoding circuit 120 of this embodiment is provided with the position generation circuit 1010 in place of the vertical position generating circuit 230 and the horizontal position generating circuit 240 of FIG. 2.

Also, a decoding control circuit 1020 is different from the decoding control circuit 270 of the first embodiment (refer to FIG. 2) in that the select signal TSSC is output. The select signal TSSC is set to '1' if a slice start code is output from the code extraction circuit 210, and is set to '0' otherwise.

FIG. 9 is a block diagram showing the internal structure of the position generation circuit 1010.

As shown in FIG. 9, this position generation circuit 1010 comprises an address decoding circuit 1110, a selector 1120, a subtraction circuit 1130, a vertical position generating circuit 1140 and a horizontal position generating circuit 1150.

Here, the address decoding circuit 1110 reads a macro block address MBA from the code data VLC, and decodes this macro block address MBA. The address decoding circuit 1110 is different from the address decoding circuit 410 of the first embodiment in that the macro block address MBA is decoded to an original value, namely a value before encoding, by the picture compression device (refer to Table 2). That is, the address decoding circuit 1110 does not change the origin coordinates. The decoded macro block address is stored in the address decoding circuit 410.

The selector 1120 is input with code data VLC from one input terminal, and input with a macro block address MBA from the other input terminal. Code data VLC is then output when the select signal TSSC is '1', and the macro block address MBA is output when the select signal TSSC is '0'. As has been described above, when the select signal TSSC is '1', the code data VLC is a slice start code.

The subtraction circuit 1130 subtracts '1' from data input from the selector 1120, and outputs the result of subtraction. Because of this subtraction, the slice start code and the macro block address MBA are changed to values corresponding to origin coordinates (0,0).

The vertical position generating circuit 1140 sequentially generates vertical position coordinates VP from the slice start code. The internal structure of the vertical position generating circuit 1140 is the same as that of the vertical position generating circuit 230 of the first embodiment (refer to FIG. 3).

The horizontal position generating circuit 1150 then generates horizontal position coordinates HP of the macro block from the head macro block address MBA for the slice. The internal structure of the horizontal position generating circuit 1150 is the same as that of the horizontal position control circuit 420 of the first embodiment (refer to FIG. 4).

Next, operation of the picture decoding device of this embodiment will be described. FIG. 10 is a timing chart for describing operation of the variable length code decoding circuit 120 of this embodiment. In the following, description will be given adopting as an example a case where a slice contains three macro blocks MB0 (3,2), MB1 (4,2) and MB2 (1,3) as shown in FIG. 6.

As has been described above, the CPU 110 does not carry out rewriting of the slice start code, that is, changing of the vertical origin coordinate. Accordingly, the variable length code decoding circuit 120 is input with data containing a slice start code and macro block address MBA corresponding to origin coordinates (1,1).

At time T0, the code extraction circuit 210 (refer to FIG. 2) performs header extraction for the slice start code. This slice start code is input to the selector 1120 of the position generating circuit 1010 (refer to FIG. 9). Also, at time T0, the select signal TSSC, is '1'. Accordingly, the selector 1120 selects code data VLC, namely, the slice start code. In the example of FIG. 6, the value of the slice start code is '2'. The subtraction circuit 1130 subtracts '1' from the slice start code. In this way, the value of the slice start code becomes '1'. The slice start code is therefore changed to a value corresponding to vertical origin coordinate '0'. This subtraction result is input to the vertical position generating circuit 1140. The vertical position generating circuit 1140 generates a vertical position coordinate VP for the macro block MB0, namely '1', by a similar operation to the vertical position generating circuit 230 of the first embodiment.

At time T1, the code extraction circuit 210 (refer to FIG. 8) performs header extraction of the macro block address MBA for the initial macro block MB0. This macro block address MBA is input to the address decoding circuit 1110 of the position generation circuit 1010. The address decoding circuit 1110 decodes the macro block address MBA to an original value, namely a value before encoding by the picture compression device, and in the example of FIG. 6, the address MBA of the initial macro block MB0 becomes '3'.

At time T2, this macro block address MBA is input to the selector 1120 of the position generation circuit 1010. At time T2, the select signal TSSC is '0'. Accordingly, the selector 1120 selects the macro block address MBA. The subtraction circuit 1130 subtracts '1' from this macro block address MBA. Accordingly, the value of the macro block address MBA becomes '2'. In this way, the macro block address MBA is changed to a value corresponding to a vertical origin coordinate '0'. This subtraction result is input to the horizontal position generating circuit 1150. The horizontal position generating circuit 1150 generates a horizontal position coordinate HP for the macro block MB0, namely '2', by a similar operation to the horizontal position control circuit 420 of the first embodiment.

At time T3, the code extraction circuit 210 performs header extraction for the macro block address MBA of the next macro block MB1. This macro block address MBA is decoded by the address decoding circuit 1110. With the example of FIG. 6, the address MBA of the macro block MB1 becomes '4'.

At time T4, the select signal TSSC is '0'. Accordingly, the selector 1120 selects the macro block address MBA. The subtraction circuit 1130 subtracts '1' from this macro block address MBA. Accordingly, the value of the macro block address MBA becomes '3'. In this way, the macro block address MBA is changed to a value corresponding to a vertical origin coordinate '0'. This subtraction result is input to the horizontal position generating circuit 1150. The horizontal position generating circuit 1150 generates a horizontal position coordinate HP for the macro block MB0, namely '3', by a similar operation to the horizontal position control circuit 420 of the first embodiment.

At time T5, the code extraction circuit 210 performs head extraction of macro block address MBA of the next macro block. This macro block address MBA is decoded using the address decoding circuit 1110. In the example of FIG. 6, the address MBA of the macro block MB1 becomes '1'.

At time T6, the select signal TSSC is '0'. Accordingly, the selector 1120 selects the macro block address MBA. The subtraction circuit 1130 subtracts '1' from this macro block address MBA. Accordingly, the value of the macro block address MBA becomes '0'. In this way, the macro block address MBA is changed to a value corresponding to a vertical origin coordinate '0'. This subtraction result is input to the horizontal position generating circuit 1150. The horizontal position generating circuit 1150 generates a horizontal position coordinate HP for the macro block MB0, namely '0', by a similar operation to the horizontal position control circuit 420 of the first embodiment. The remaining operation is the same as for the first embodiment.

As has been described above, with the picture decoding device of this embodiment, it is possible to change origin coordinates of the macro block from (1,1) to (0,0) simply by adding the selector 1120 and the subtraction circuit 1130. Accordingly, the scale of the variable length code decoding circuit 120 and the motion compensation circuit 150 is reduced, and design is simplified.

As has been described in detail above, according to the present invention, since a slice start code and macro block are rewritten, it is possible to convert macro block origin coordinates to (0,0) with simple processing. Also, by converting the origin coordinates to (0,0), the scale of a variable length code decoding circuit and motion compensation circuit is reduced, and design is simplified. Therefore, according to the present invention, it is possible to provide a picture decoding device with reduced circuit scale and simple design.

TABLE 1

Relationship between start code value and code name

| Code name | Start code value |
|---|---|
| picture_start_code | 00 |
| Slice_start_code | 01~AF |
| reserved | B0 |
| reserved | B1 |
| user_data_start_code | B2 |
| sequence_header_code | B3 |
| sequence_error_code | B4 |
| extension_start_code | B5 |
| reserved | B6 |
| sequence_end_code | B7 |
| group_start_code | B8 |
| system_start_code | B9~FF |

TABLE 2

Decoding of first embodiment

| Macro block address (before encoding) | Macro block address (variable length code) | Macro block address (after encoding) |
|---|---|---|
| 1 | 1 | 0 |
| 2 | 011 | 1 |
| 3 | 010 | 2 |
| 4 | 0011 | 3 |
| 5 | 0010 | 4 |
| 6 | 00011 | 5 |
| 7 | 00010 | 6 |
| 8 | 0000111 | 7 |
| 9 | 0000110 | 8 |
| 10 | 00001011 | 9 |
| 11 | 00001010 | 10 |
| 12 | 00001001 | 11 |
| 13 | 00001000 | 12 |
| 14 | 00000111 | 13 |
| 15 | 00000110 | 14 |
| 16 | 0000010111 | 15 |
| 17 | 0000010110 | 16 |
| 18 | 0000010101 | 17 |
| 19 | 0000010100 | 18 |
| 20 | 0000010011 | 19 |
| 21 | 0000010010 | 20 |
| 22 | 00000100011 | 21 |

TABLE 2-continued

Decoding of first embodiment

| Macro block address (before encoding) | Macro block address (variable length code) | Macro block address (after encoding) |
|---|---|---|
| 23 | 00000100010 | 22 |
| 24 | 00000100001 | 23 |
| 25 | 00000100000 | 24 |
| 26 | 00000011111 | 25 |
| 27 | 00000011110 | 26 |
| 28 | 00000011101 | 27 |
| 29 | 00000011100 | 28 |
| 30 | 00000011011 | 29 |
| 31 | 00000011010 | 30 |
| 32 | 00000011001 | 31 |
| 33 | 00000011000 | 32 |
| macroblock_espace | 00000001000 | macroblock_espace |
| macroblock_stuffing | 000000001111 | macroblock_stuffing |

What is claimed is:

1. A picture decoding device, comprising:
a CPU, input with encoded moving picture information, for subtracting '1' from a slice start code within slice information extracted from the encoded moving picture information;
a variable length code decoding circuit provided with a horizontal position generating circuit for subtracting '1' from a macro block address MBA when output information formed from macro block position information, movement vectors, and picture information is output, using information output from the CPU; and
a movement compensation circuit for performing decoding processing for the moving picture information with an origin coordinate set to (0,0), using the slice start code and the macro block address after subtraction.

2. The picture decoding device of claim 1, wherein the variable length code decoding circuit comprises:
a code extraction circuit, for outputting variable length code data and fixed length code data using information output from the CPU and information stored in a code length table; and
a vertical position generating circuit, for reading out a slice start code rewritten to a value corresponding to an origin coordinate '0' from the encoded data, and outputting a vertical position VP,
wherein the horizontal position generating circuit reads out a macro block address MBA from the encoded data, and outputs a horizontal position coordinate HP corresponding to a horizontal origin position '0'.

3. A picture decoding device, comprising:
a CPU, input with encoded moving picture information, for outputting data, including a slice start code and a macro block address MBA corresponding to origin coordinates (1,1), to a code extraction circuit;
a variable length code decoding circuit provided with a position generating circuit having a subtraction circuit for changing the slice start code and the macro block address MBA to values corresponding to origin coordinates (0,0); and
a movement compensation circuit for carrying out decoding processing for the moving picture information, with origin coordinates set to (0,0), using the changed slice start code and macro block address.

4. The picture decoding device of claim 3, wherein the variable length code decoding circuit is provided with a position generating circuit, and the position generating circuit is provided with, an address decoding circuit for decoding and outputting a macro block address MBA read out from code data output from the code extraction circuit, and a subtraction circuit for subtracting '1' from the slice start code or macro block address MBA corresponding to origin coordinates (1,1) based on select signal TSSC representing whether or not a slice start code is being output from the code extraction circuit.

5. A picture decoding device, comprising:
first means for subtracting '1' from a slice start code of compression encoded picture information;
second means for subtracting '1' from a macro block address of the picture information; and
decoding means, for carrying out decoding processing for the picture information, having origin coordinates set to (0,0), using the slice start code and macro block address after subtraction.

6. The picture decoding device of claim 5, wherein the first means is means for subtracting '1' from the slice start code when information below a slice layer is extracted from the picture information.

7. The picture decoding device of claim 5, wherein the second means, after separating data below a slice layer into variable length code and fixed length code, decodes to a value '1' less than a macro block address before compression encoding when decoding the macro block address obtained by the separation of the data.

8. The picture decoding device of claim 6, wherein the second means is means for, after separating data below a slice layer into variable length code and fixed length code, decoding to a value '1' than a macro block address before compression encoding when decoding the macro block address obtained by the separation of the data.

9. The picture decoding device of claim 5, wherein the first means is means for separating data below a slice layer into variable length code and fixed length code and then subtracting '1' from the slice start code obtained by this separation, and supplying a result to vertical position generating means.

10. The picture decoding device of claim 5, wherein the second means is means for separating data below a slice layer into variable length code and fixed length code and decoding the macro block address obtained by this separation, then subtracting '1' from this macro block address and supplying a result to horizontal position generating means.

11. The picture decoding device of claim 9, wherein the second means is means for separating data below a slice layer into variable length code and fixed length code and decoding the macro block address obtained by this separation, then subtracting '1' from this macro block address and supplying a result to horizontal position generating means.

12. A picture decoding device, comprising:
a CPU, input with encoded moving picture information, for subtracting '1' from a slice start code within slice information extracted from the encoded moving picture information;
a variable length code decoding circuit provided with a horizontal position generating circuit for subtracting '1' from a macro block address MBA when output information formed from macro block position information is output, using information output from the CPU; and
a movement compensation circuit for performing decoding processing for the moving picture information with an origin coordinate set to (0,0), using the slice start code and the macro block address after subtraction.

* * * * *